United States Patent
Kim

(10) Patent No.: US 10,460,179 B2
(45) Date of Patent: Oct. 29, 2019

(54) SYSTEM AND METHOD FOR RECOGNIZING A LANE

(71) Applicant: Mando-Hella Electronics Corporation, Incheon (KR)

(72) Inventor: Shinwook Kim, Seoul (KR)

(73) Assignee: MANDO HELLA ELECTRONICS CORPORATION, Incheon (KR)

(*) Notice: Subject to any disclaimer, the term of this patent is extended or adjusted under 35 U.S.C. 154(b) by 134 days.

(21) Appl. No.: 15/659,575

(22) Filed: Jul. 25, 2017

(65) Prior Publication Data

US 2018/0260634 A1    Sep. 13, 2018

(30) Foreign Application Priority Data

Mar. 10, 2017 (KR) .................. 10-2017-0030480

(51) Int. Cl.
*G06K 9/00* (2006.01)
*G06K 9/32* (2006.01)
(Continued)

(52) U.S. Cl.
CPC ....... *G06K 9/00798* (2013.01); *G06K 9/3233* (2013.01); *G06K 9/627* (2013.01);
(Continued)

(58) Field of Classification Search
CPC ....... A61B 34/20; A61B 34/10; A61B 5/4561; G06F 3/011; G06K 9/00798;
(Continued)

(56) References Cited

U.S. PATENT DOCUMENTS 5,675,489 A * 10/1997 Pomerleau .......... G05D 1/0246
701/28
8,311,965 B2    11/2012 Breitwisch et al.
(Continued)

FOREIGN PATENT DOCUMENTS

CN           105930830        9/2016
DE    11 2010 004 470       12/2013
(Continued)

OTHER PUBLICATIONS

Kim et al. (Robust Lan Detection Based on Convolutional Neural Network and Random Sample Consensus) ICONIP 2014 Part I, pp. 454-461.*

(Continued)

*Primary Examiner* — Jingge Wu
(74) *Attorney, Agent, or Firm* — Ladas & Parry, LLP

(57) ABSTRACT

A lane recognition system and method are disclosed. The lane recognition system according to an embodiment of the present invention includes an image sensor for capturing an image comprising a lane; a neuromorphic system in which a plurality of neurons in which a pattern vector related to a lane information are stored are connected by a parallel bus; and a lane recognition unit for generating [1×N] size input vectors of a predetermined size for a region of interest of the input image frame input from the image sensor, for inputting the generated vector to the neuromorphic system, and for recognizing a lane in the input image based on lane information of a neuron having a pattern vector most similar to an input vector among a plurality of neurons stored in the system.

4 Claims, 5 Drawing Sheets

(51) Int. Cl.
*G06K 9/62* (2006.01)
*G06N 3/08* (2006.01)
*G06K 9/48* (2006.01)
*G06K 9/46* (2006.01)

(52) U.S. Cl.
CPC .......... *G06K 9/6211* (2013.01); *G06K 9/6261* (2013.01); *G06K 9/6262* (2013.01); *G06K 9/6273* (2013.01); *G06N 3/08* (2013.01); *G06K 9/4652* (2013.01); *G06K 9/48* (2013.01); *G06K 9/6255* (2013.01)

(58) Field of Classification Search
CPC ............ G06K 9/00818; G06K 9/00791; G06T 2207/30256; G06T 2207/20081
See application file for complete search history.

(56) References Cited

U.S. PATENT DOCUMENTS

| | | | | |
|---|---|---|---|---|
| 9,286,524 | B1* | 3/2016 | Mei | G06K 9/6273 |
| 9,489,585 | B2 | 11/2016 | Sakamoto | |
| 9,672,734 | B1* | 6/2017 | Ratnasingam | G08G 1/0112 |
| 9,760,806 | B1* | 9/2017 | Ning | B60W 50/14 |
| 2006/0210116 | A1* | 9/2006 | Azuma | G06K 9/00798 |
| | | | | 382/104 |
| 2009/0201140 | A1* | 8/2009 | Fargas | B60W 40/101 |
| | | | | 340/441 |
| 2015/0134232 | A1* | 5/2015 | Robinson | G08G 1/0116 |
| | | | | 701/117 |
| 2016/0321540 | A1* | 11/2016 | Towal | G06N 3/04 |
| 2016/0321784 | A1* | 11/2016 | Annapureddy | G06K 9/66 |
| 2017/0011281 | A1* | 1/2017 | Dijkman | G06K 9/66 |
| 2017/0039436 | A1* | 2/2017 | Chen | G06K 9/00798 |
| 2017/0185872 | A1* | 6/2017 | Chakraborty | G06K 9/66 |
| 2017/0193338 | A1* | 7/2017 | Huberman | G05D 1/0088 |
| 2017/0267177 | A1* | 9/2017 | Nariyambut Murali | |
| | | | | B60R 1/00 |
| 2017/0300763 | A1* | 10/2017 | Zou | G06K 9/00798 |
| 2018/0107215 | A1* | 4/2018 | Djuric | G01C 21/26 |
| 2018/0129887 | A1* | 5/2018 | Kang | G06T 7/70 |
| 2018/0164812 | A1* | 6/2018 | Oh | G05D 1/00 |
| 2018/0173934 | A1* | 6/2018 | Zink | H04N 5/232 |
| 2018/0181817 | A1* | 6/2018 | Yan | G06N 3/02 |

FOREIGN PATENT DOCUMENTS

| | | |
|---|---|---|
| KR | 2002-0088124 | 11/2002 |
| KR | 10-1178507 | 9/2012 |
| KR | 10-1225626 | 1/2013 |
| KR | 10-1584907 | 1/2016 |

OTHER PUBLICATIONS

Office Action dated Dec. 20, 2017 for Korean Patent Application No. 10-2017-0030480 and its English translation by Google Translate.

2015 IEEE Symposium Series on Computational Intelligence; "Neuromorphic Hardware Accelerated Adaptive Authentication System", Manan Suri, Vivek Parmar, Akshay Singla, Rishabh Malviya, Surag Nair; Department of Electrical Engineering, Indian Institute of Technology, Delhi, 2015, pp. 1206-1213.

* cited by examiner

SYSTEM AND METHOD FOR RECOGNIZING A LANE

CROSS-REFERENCE TO RELATED APPLICATION

This application claims the priority to Korean Patent Application No. 10-2017-0030480, filed on Mar. 10, 2017 in the Korean Intellectual Property Office, the disclosure of which is incorporated herein by reference in its entirety.

TECHNICAL FIELD

The present disclosure relates to a lane recognition system and method, and more particularly, to the lane recognition system and method for recognizing a lane by analyzing a road image captured through a camera.

BACKGROUND ART

In general, accurate recognition of lanes is an essential element for the implementation of an advanced driver assistance systems (ADAS) and the realization of autonomous vehicles. In most cases, the road image is obtained by mounting the vision sensor based camera on the front of the vehicle, and the lane is detected through the image processing process. The results of the lane recognition can be used for Lane Departure Warning System (LDWS), Lane Keeping Assist System, etc.

More research has been carried out for accurate and robust recognition of the lane that provides this important information. The most representative method for lane detection is a method of extracting straight line components of a certain length or more in the image by using Hough transform after extracting the edges of an input image.

However, in the case of Hough transform, various attempts have been proposed to reduce an area to be computed as much as possible because of the large computational burden. In other words, by using the brightness characteristics of the lane area or by analyzing the color information of the lane, it is proposed to improve the processing time by setting it as the region of interest (ROI) and searching the limited range.

The results of the lane recognition are derived from the application of the spline, the least squares method, or the RANSAC (RANdom SAmple Consensus) method.

The result of the lane recognition is used to derive the lane equations from the third or higher-order equations through the method by using the application of the spline or the least squares method, or RANSAC, etc.

However, in spite of efforts to reduce the computation burden for real-time processing through a lot of conventional studies, due to the sensitivity to the environment and lighting changes that an image sensor contains, additional post-processing algorithms are required, which makes real-time processing of lane recognition more difficult in an embedded environment.

RELATED ART DOCUMENT

Korea Patent Registration Publication No 10-1584907
2015 IEEE Symposium Series on Computational Intelligence, Neuromorphic Hardware Accelerated Adaptive Authentication System, Manan Suri, Vivek Parmar, Akshay Singla, Rishabh Malviya, Surag Nair

DISCLOSURE

Technical Problem

An embodiment of the present disclosure is to provide a lane recognition system and method for more effectively recognizing lanes in a road image captured by a camera using a neuromorphic system.

Technical Solution

According to an aspect of the present disclosure, an image sensor for capturing an image comprising a lane; a neuromorphic system in which a plurality of neurons in which a pattern vector related to a lane information are stored are connected by a parallel bus; and a lane recognition system comprising a lane recognition unit for generating a vector having a size of [1×N] of a window of a predetermined size with respect to a region of interest (ROI) of the image frame input from the image sensor, for inputting the generated vector to the neuromorphic system, and for recognizing a lane in the input image based on lane information of a neuron having a pattern vector most similar to an input vector among a plurality of neurons stored in the system can be provided.

In addition, the pattern vector comprising a vehicle information related to at least one of a lane color and a lane shape may be stored in advance in the plurality of neurons.

Also, the neuromorphic system simultaneously propagates the input vector to a plurality of neurons inside the system through the parallel bus, compares the input vector with the pattern vector stored in the plurality of neurons to obtain the neuron having the smallest relative distance value and outputs the category value of the selected neuron to the lane recognition unit; and the lane recognition unit may recognize the lane in the input image based on the category values output from the neuromorphic system.

According to another aspect of the present disclosure, a lane recognition method of receiving an image frame comprising a lane; generating [1×N] size input vectors of a predetermined size for a region of interest of the input image frame; inputting the generated vector into the neuromorphic system in which the plurality of neurons storing pattern vectors related to lane information are connected by a parallel bus; and recognizing a lane in the input image using lane information of the neuron having a pattern vector most similar to the input vector among the plurality of neurons stored in the neuromorphic system may be provided.

Also, in the lane recognition, the input vector is simultaneously propagated to the plurality of neurons via the parallel bus, and the input vector and the pattern vector stored in the plurality of neurons are compared to select the neuron having the smallest relative distance value, and the category value of the selected neuron is output, and the lane can be recognized in the input image using the output category values.

Advantageous Effects

The embodiment of the present disclosure can more effectively recognize the lane since the color and shape of the lane are recognized by using the neuromorphic system in which various colors and shapes of the lane are stored in the pattern form.

Embodiments of the present disclosure can reduce the computation burden compared with the conventional method, recognize lane forms such as solid line/dotted line, lane colors such as yellow/white, and can extend the recognition range of the shape or color of the lane without changing the structure or algorithm.

DETAILED DESCRIPTION OF THE INVENTION

Figure 1:
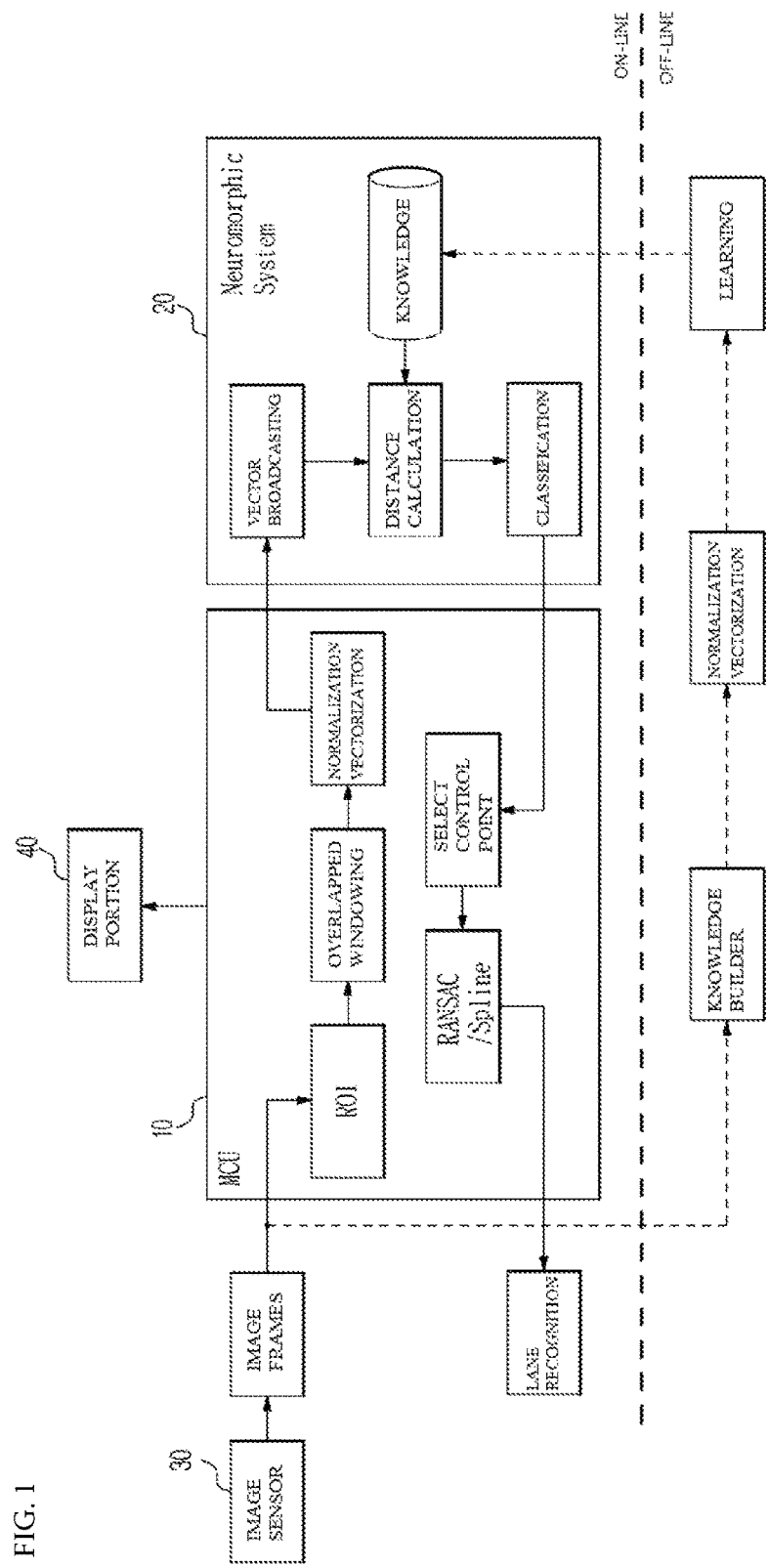
FIG. 1 is a block diagram of a lane recognition system according to an embodiment of the present disclosure.

Hereinafter, embodiments of the present disclosure will be described in detail with reference to the accompanying drawings. The embodiments described below are provided by way of example for the purpose of fully understanding the spirit of the present disclosure to a person having ordinary skill in the art to which the present disclosure belongs. The present disclosure is not limited to the embodiments described below but may be embodied in other forms. In order to clearly explain the present disclosure, parts not related to the description are omitted, and in the drawings, the width, length, thickness, etc. of the components may be exaggerated for convenience. Like reference numerals designate like elements throughout the specification.

An embodiment of the present disclosure proposes a lane recognition system based on neuromorphic hardware. In the proposed system, the neuromorphic hardware constructs the human brain and neurons responsible for recognition are implemented and integrated in the form of hardware to learn and recognize a shape of the lane, and by combining this with the vision sensor, the real time input images are recognized and classified using lane patterns learned in advance.

In the offline environment, the lane patterns are extracted from the training images obtained in a various driving situation such as daytime, nighttime, tunnel and backlight, snow or rain to build the knowledge about the lane. By learning this knowledge in the distributed local memory inside the neurons, input lane patterns could be classified as the lane.

In addition, when learning the lane color and the lane type according to learning method, it can be recognized as a separate lane according to lane color difference between white and yellow and lane shape difference between solid line and dotted line.

In the embodiment of the present disclosure, in order to acquire the input image, a lane pattern is learned so that may be recognized by distinguishing a yellow lane and a white lane by mounting an RGB color sensor of 1024×768 resolution in front of the vehicle. When the input image stream is input to the lane recognition system without any image processing by designating the lower 60% area of the image frame as a region of interest (ROI), yellow lane points and white lane points can be obtained, and the coordinates obtained as a result of the recognition can be represented as yellow lanes and white lanes after removing the outliers through the RANSAC algorithm.

FIG. 1 is a block diagram of a lane recognition system according to an embodiment of the present disclosure.

Referring to FIG. 1, the lane recognition system may include the lane recognition unit 10 and the neuromorphic system 20.

The lane recognition unit 10 may include a microcontroller unit (MCU).

The lane recognition unit 10 serves to generate an input vector for input to the neuromorphic system 20.

The neuromorphic system 20 receives the input vector from the lane recognition unit.

The neuromorphic system 20 compares the input vector with the reference pattern stored in the knowledge and transmits the category value of the neuron having the most similar pattern as a return value to the lane recognition unit 10. The knowledge may be a database of patterns stored by each neuron.

The lane recognition unit 10 finally recognizes the lane by combining the each pattern recognized as the lane.

More specifically, the lane recognition unit 10 first receives the continuous image frames output from the image sensor 30.

The lane recognition unit 10 sets the region of interest (ROI) in each received image frame. Since the lane is generally not present at an arbitrary position but at the bottom of the vanishing point seen in the image, the region of interest is determined as the lower half of the image height.

The lane recognition unit 10 reads the pixel values of the image by sliding the overlapping values of windows of a predetermined size. For example, the pixel value is read by repeatedly sliding the X and Y axes in a 16×16 size window with 50% overlapping values by 8 pixels each.

The lane recognition unit 10 performs a normalization process so that each window has a robustness against a change in brightness or a change in color. In this process, the histogram equalization or min-max equalization method may be performed. The normalized window is transformed into a vector form of [1×N] size.

The lane recognition unit 10 inputs the vector generated in the above process to the neuromorphic system 20.

The neuromorphic system 20 simultaneously propagates the vector input by the lane recognition unit 10 to the thousands of neurons constituting the interior of the neuromorphic system through the parallel bus.

In the neuromorphic system 20, each neuron inside the neuromorphic system starts calculating the relative distance between the input vector and the pattern vector stored in the neuron when the input vector begins to be input and updates the distance value until the input of the input vector is completed.

When the calculation of the distance between the input vector and the stored pattern is completed, the neuromorphic system 20 selects the neurons having the smallest relative distance among thousands of neurons, and outputs the category value of the neuron having the smallest distance value based on the knowledge.

The neuromorphic system 20 transmits the output category values back to the lane recognition unit 10.

The lane recognition unit 10 collects the classified results and finally recognizes the lane. The lane recognition unit 10 displays the recognized lane on the display portion 40. In this process, the lane recognition unit 10 draws the lane on the display portion 40 by using RANSAC or Spline.

Hereinafter, the lane recognition method using the neuromorphic system 20 will be described in detail.

The neuromorphic system 20 is a technology developed by imitating the mechanism of learning and recognition in the human brain and is a technology in which information processing principles of human biological neurons are modeled and implemented in hardware. (see Patent Document 2 mentioned above).

Thousands of hardware-implemented neurons are integrated into the neuromorphic system 20.

Each neuron making up the neuromorphic system 20 is all connected to the parallel bus and receives the input vector at the same time.

Each neuron has a local memory that stores a reference pattern.

The reference pattern to be stored in the local memory of the neurons is obtained via a separate program in offline.

When an input vector is transferred to the neuromorphic system 20, all the neurons of the neuromorphic system 20 simultaneously receive the corresponding input vector. At the same time, the relative distance between the pattern held by each neuron and the input vector is calculated.

At this time, the neuron having the smallest relative distance is finally selected. The category value of the selected neuron is transmitted to the lane recognition unit 10. The lane recognition unit 10 recognizes the lane based on the received category values.

For example, in case of a knowledge learned in a white lane as category 1, a yellow lane as a category 2, and other background as a category 3, if a part of the white lane is input as the input vector, category 1 is output and if the yellow lane is input, category 2 is output.

Figure 2:
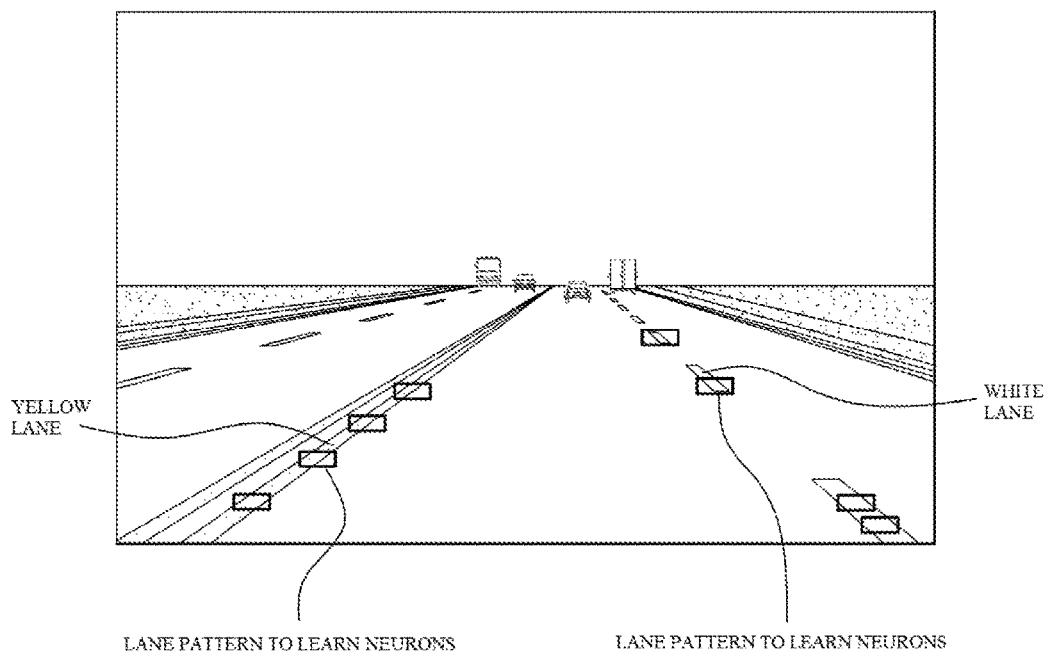
FIG. 2 and FIG. 3 are views showing lane patterns in which neurons learn, in a lane recognition system according to an embodiment of the present disclosure.
Figure 3:
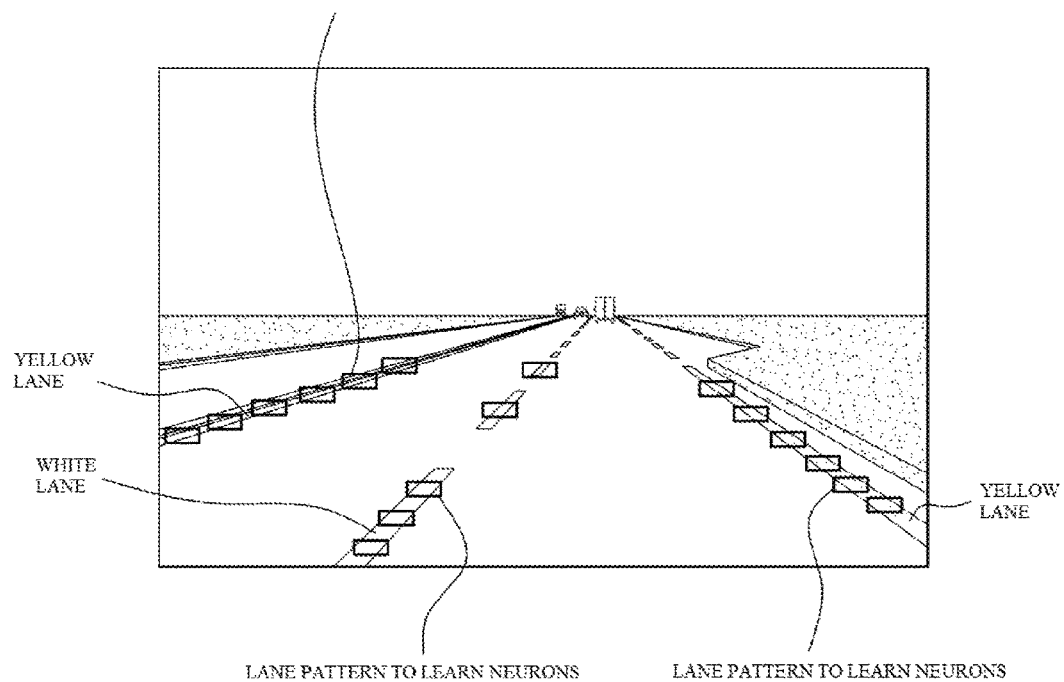

FIGS. 2 to 3 are views showing lane patterns of neurons to be learned by a lane recognition system according to the embodiment of the present invention.

The lane pattern of white lanes and yellow lanes is extracted in advance in an offline environment using image frames obtained in various practical driving environments such as daytime, nighttime, tunnel and backlight, snow or rain.

Rectangular boxes in the image frame represent the lane patterns that the neurons will learn as the white lanes and the yellow lanes.

Figure 4:
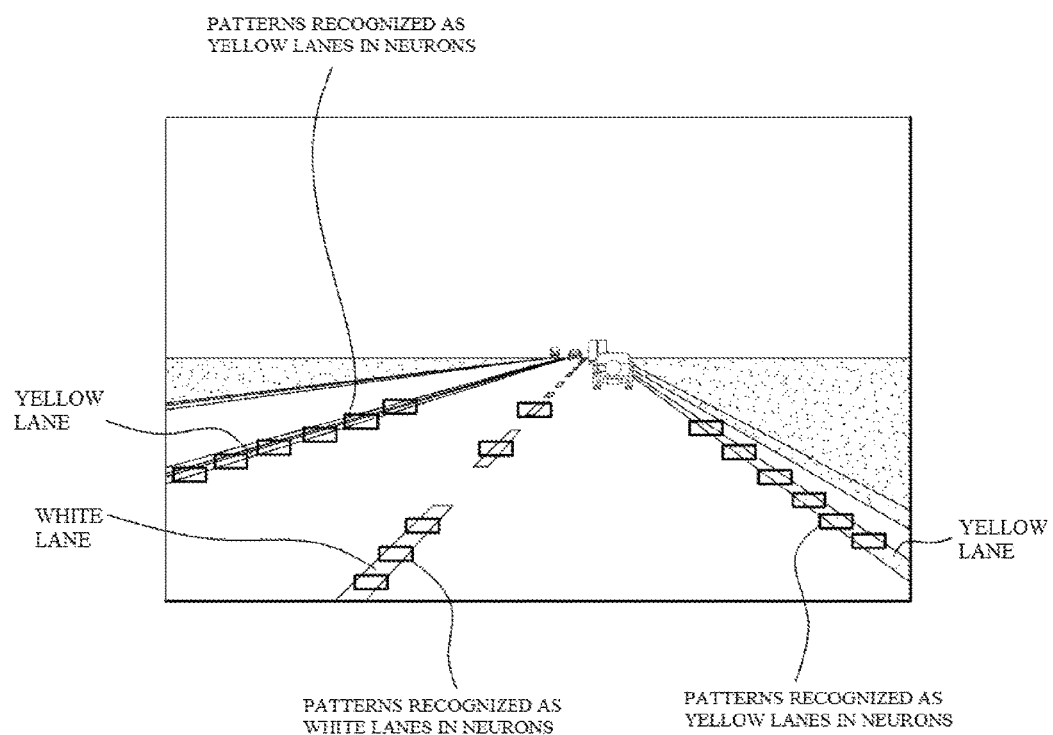
FIG. 4 is a view illustrating lane recognition results in a lane recognition system according to an embodiment of the present disclosure.

The lane patterns learned by the neuron are stored in the distributed memory area inside the neuron. FIG. 4 is a view illustrating a lane recognition result in a lane recognition system according to an embodiment of the present invention, and FIG. 5 is a view illustrating a lane marking result using a lane equation in a lane recognition system according to an embodiment of the present invention.

As shown in FIG. 4, when an image frame comprising a white lane and a yellow lane is input, The neuromorphic system 20 recognize white lanes and yellow lanes as separate patterns using neurons inside.

Figure 5:
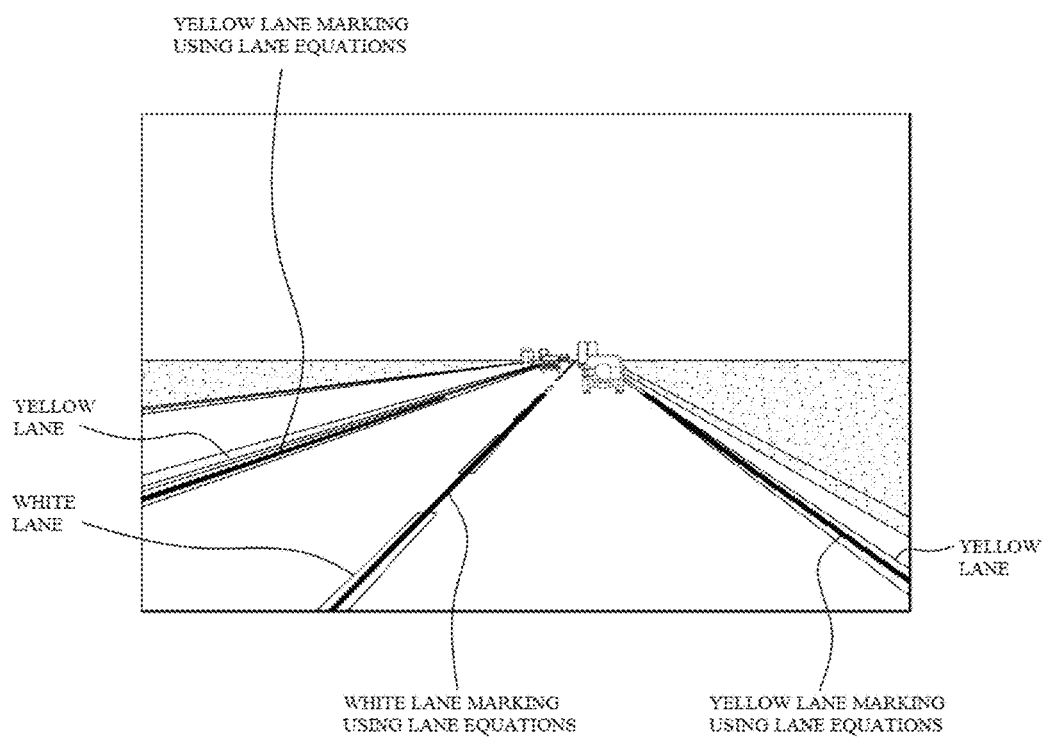
FIG. 5 is a view illustrating a lane marking result using a lane equation in a lane recognition system according to an embodiment of the present disclosure.

As shown in FIG. 5, Among the patterns recognized as white lanes and yellow lanes by the neurons in the image frame, the RANSAC algorithm removes the outlier coordinates and calculates the lane equation. The white and yellow lane marking are drawn on the original image using the derived lane equation.

As described above, conventionally, a large amount of computation is required using image processing algorithms, or it is only possible to detect the lane itself, so that it is difficult to provide meaningful information for autonomous vehicles, and to add an additional lane shape or color, however, the embodiment of the present invention proposes a lane recognition system that compensates for the disadvantages of the existing method and allows lanes to be recognized in real time even in an embedded environment.

That is, the embodiment of the present invention implements a lane recognition system capable of faster and more accurate lane recognition without using an existing image processing algorithm.

Since it does not use the conventional image processing algorithm which consumes a large amount of computation, the amount of computation can be reduced, real-time processing can be achieved, and manufacturing cost can be reduced without the need of applying an expensive CPU or DSP (Digital Signal Processor).

In addition, the embodiment of the present invention can recognize the color or the shape of the lane as well as recognize the lane itself. This allows us to understand the meaning of each lane and can be used to plan the route in the autonomous driving process by transmitting the information to the autonomous driving vehicle. Not only the detection of the lane itself but also the lane color such as a solid line or dotted line, lane color such as yellow/white can be recognized, and meaningful information can be transmitted to the autonomous vehicle.

In addition, embodiments of the present invention allow the system to immediately recognize unknown lanes by learning new patterns of lane shape and lane color offline without adding new algorithms or modules. Lane shapes and colors can be added by country/city/function without additional structural changes or algorithm changes.

The invention claimed is:

1. A lane recognition system comprising:
    an image sensor for capturing an image comprising a lane;
    a neuromorphic system in which a plurality of neurons in which pattern vectors related to a lane information are stored are connected by a parallel bus, wherein the plurality of neurons storing the pattern vectors including information related to a lane color and a lane shape; and
    a lane recognition unit configured to generate [1×N] size input vectors of a predetermined size for a region of interest of the input image frame input from the image sensor, to input the generated vector having [1×N] size to the neuromorphic system, and to recognize a lane in the input image based on lane information of a neuron having a pattern vector most similar to an input vector among a plurality of neurons stored in the neuromorphic system by comparing the input vector with the pattern vectors stored in the plurality of neurons to obtain one neuron having the smallest relative distance value.

2. The system according to claim 1, wherein the neuromorphic system simultaneously propagates the input vector to a plurality of neurons inside the neuron through the parallel bus, compares the input vector with the pattern vector stored in the plurality of neurons to obtain the neuron having the smallest relative distance value and outputs the category value of the selected neuron to the lane recognition unit; and the lane recognition unit recognizes the lane in the input image based on the category values output from the neuromorphic system.

3. A lane recognition method comprising:
    receiving an image frame comprising a lane;
    generating [1×N] size input vectors of a predetermined size for an area of interest of the input image frame;
    inputting the generated input vector having [1×N] size into a neuromorphic system in which a plurality of neurons storing pattern vectors related to lane information are connected by a parallel bus, wherein the plurality of neurons storing the pattern vectors including information related to a lane color and a lane shape; and recognizing a lane in the input image using lane information of the neuron having a pattern vector most similar to the input vector among the plurality of neurons stored in the neuromorphic system by comparing the input vector with the pattern vectors stored in the plurality of neurons to obtain one neuron having the smallest relative distance value.

4. The system according to claim 3, further comprising:

propagating the input vector to the plurality of neurons simultaneously via the parallel bus in the lane recognition;

selecting the one neuron having the smallest relative distance value by comparing the input vector with the pattern vectors stored in the plurality of neurons;

outputting a category value of the selected neuron; and recognizing a lane in the input image using the output category values.

* * * * *